US010632530B2

(12) United States Patent
Fujikawa

(10) Patent No.: US 10,632,530 B2
(45) Date of Patent: Apr. 28, 2020

(54) INJECTION MOLDING MACHINE

(71) Applicant: SODICK CO., LTD., Kanagawa (JP)

(72) Inventor: Misao Fujikawa, Kanagawa (JP)

(73) Assignee: SODICK CO., LTD., Kanagawa (JP)

(*) Notice: Subject to any disclaimer, the term of this patent is extended or adjusted under 35 U.S.C. 154(b) by 88 days.

(21) Appl. No.: 15/721,748

(22) Filed: Sep. 30, 2017

(65) Prior Publication Data
US 2018/0117672 A1 May 3, 2018

(30) Foreign Application Priority Data
Oct. 27, 2016 (JP) .................... 2016-210482

(51) Int. Cl.
B22D 17/30 (2006.01)
B22D 17/10 (2006.01)
B22D 17/28 (2006.01)
B29C 45/00 (2006.01)
B29C 45/18 (2006.01)

(52) U.S. Cl.
CPC ............ B22D 17/30 (2013.01); B22D 17/10 (2013.01); B22D 17/28 (2013.01); B29C 45/0001 (2013.01); B29C 45/18 (2013.01)

(58) Field of Classification Search
CPC ......... B22D 17/10; B22D 17/28; B22D 17/30
USPC ................................ 164/303, 312
See application file for complete search history.

(56) References Cited

U.S. PATENT DOCUMENTS

| 4,522,784 | A | * | 6/1985 | Enright et al. | .......... B22D 11/11 148/411 |
| 5,836,372 | A | * | 11/1998 | Kono | .................. B22D 17/007 164/113 |
| 7,066,236 | B2 | | 6/2006 | Fujikawa | |
| 2004/0231820 | A1 | * | 11/2004 | Hirai et al. | ............ B22D 17/04 164/113 |
| 2005/0056978 | A1 | | 3/2005 | Fujikawa | |
| 2006/0243414 | A1 | * | 11/2006 | Takizawa et al. | ... B22D 17/007 164/113 |

FOREIGN PATENT DOCUMENTS

JP 2004195527 7/2004
JP 4119892 7/2008

* cited by examiner

Primary Examiner — Kevin P Kerns
(74) Attorney, Agent, or Firm — JCIPRNET

(57) ABSTRACT

There is provided an injection molding machine that includes a melting device in which a molding material melts to generate a molten material; an injection device from which the molten material supplied from the melting device is injected; and a connecting member including a communication path communicating with the melting device and the injection device. The melting device includes a material supply port to which the molding material is supplied, a partition plate that partitions the inside excluding at least both ends of the melting device and extends from the side of the material supply port to the side of the communication path, and a stirrer configured to stir the molten material in a manner of circulating around the partition plate.

18 Claims, 8 Drawing Sheets

INJECTION MOLDING MACHINE

CROSS-REFERENCE TO RELATED APPLICATION

This application claims the priority benefit of Japan application serial no. 2016-210482, filed on Oct. 27, 2016. The entirety of the above-mentioned patent application is hereby incorporated by reference herein and made a part of this specification.

BACKGROUND OF THE INVENTION

Field of the Invention

The present invention relates to an injection molding machine. Specifically, the present invention relates to an injection molding machine suitable for injection molding in which a molding material is a light metal.

Description of Related Art

An injection molding machine disclosed in Patent Document 1 includes a melting device which heats and melts a molding material to generate a molten material, an injection device which meters a predetermined amount of the molten material and injects the molten material into a cavity of a mold, and a connecting member that connects the melting device and the injection device. The molten material which is the molding material melted in the melting device is sent to the injection device through a communication path in the connecting member.

In the injection molding machine, when the molten material stagnates, it is difficult to uniformly transfer heat to the molding material and the molten material, and melting efficiency decreases. In particular, in the vicinity of a material supply port, since heat is absorbed by an unmelted molding material, a temperature of the molten material is likely to decrease. In addition, in particular, when the molding material is an alloy material such as a light metal alloy, there is a risk of sedimentation and segregation when stagnation occurs for a long time. When sedimentation and segregation occur, a distribution of component elements becomes uneven and characteristics partially change so that various problem can occur. For example, a part of the molten material can be in a solidified state below a melting point or quality of a molded article can deteriorate. For the above reasons, it is preferable that the molten material be stirred so that stagnation does not occur. Here, for example, in Patent Document 2, an injection molding machine including a stirrer configured to stir a molten material is disclosed.

PRIOR ART DOCUMENT

Patent Documents

[Patent Document 1] Japanese Patent No. 4119892
[Patent Document 2] Japanese Unexamined Patent Application Publication No. 2004-195527

SUMMARY OF THE INVENTION

However, simply providing a stirrer is not enough. For example, in the injection molding machine disclosed in Patent Document 2, in parts excluding other than the vicinity of the stirrer, sufficient flow of a molten material is not considered to be generated, and there is a possibility of the molten material stagnating. It is preferable that the molten material be stirred at the whole of the inside the melting device.

The present invention has been made in view of the above circumstances, and the present invention provides an injection molding machine that includes a stirrer configured to stir a molten material in a melting device and a partition plate. According to the injection molding machine, it is possible to prevent stagnation more effectively by generating a characteristic flow using the partition plate, it is possible to improve melting efficiency of a molding material and obtain a homogenous molten material.

The present invention provides an injection molding machine including a melting device in which a molding material melts to generate a molten material; an injection device from which the molten material supplied from the melting device is injected; and a connecting member including a communication path communicating with the melting device and the injection device. The melting device includes a material supply port to which the molding material is supplied, a partition plate that partitions the inside excluding at least both ends of the melting device and extends from the side of the material supply port to the side of the communication path, and a stirrer configured to stir the molten material that circulates around the partition plate.

In the injection molding machine according to the present invention, when a flow of the molten material is generated to circulate around the partition plate provided in the melting device, it is possible to prevent stagnation by generating a flow of the molten material at the whole of the inside of the melting device to improve melting efficiency of the molding material and obtain a homogenous molten material.

DESCRIPTION OF THE EMBODIMENTS

Figure 1:
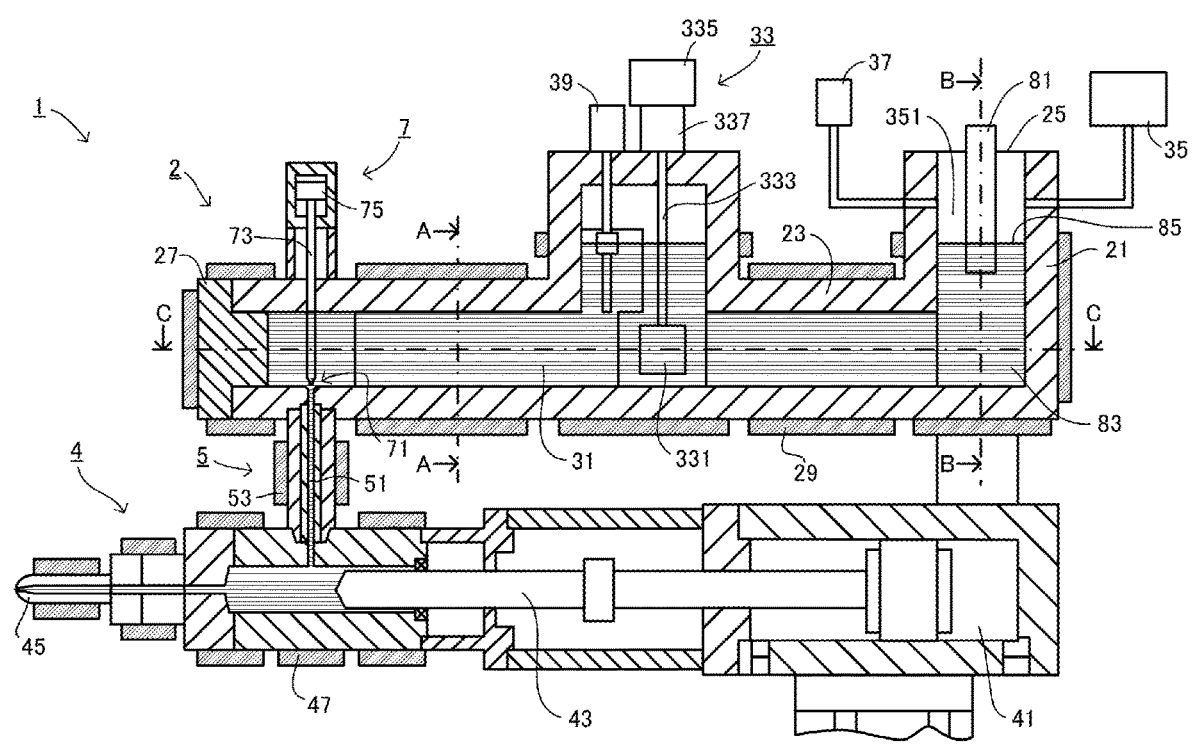
FIG. 1 is a configuration diagram of an injection unit 1 according to a first embodiment of the present invention.
Figure 2:
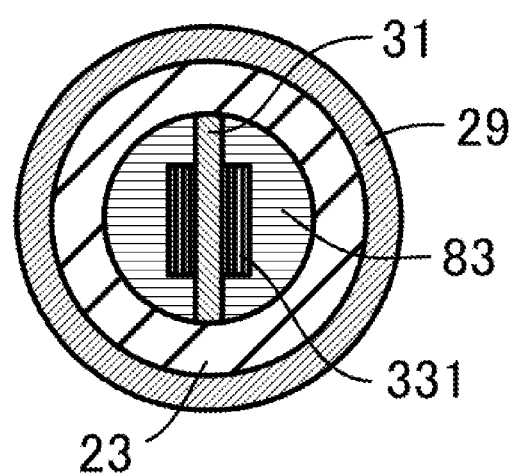
FIG. 2 is a cross-sectional view taken along arrows A-A in FIG. 1.

Embodiments of the present invention will be described below with reference to the drawings. Embodiments and examples in which a plurality of components are modified to be described below can be performed in any combination. Here, in the following description, "front end" refers to a side from which a molten material 83 is injected, and specifically a left side end of a melting device 2 or an injection device 4 in FIG. 1 and FIG. 6. "Rear end" refers to a side to which a molding material 81 is supplied, and specifically a right side end of a melting device 2 or an injection device 4 in FIG. 1 and FIG. 6.

An injection molding machine of an embodiment has a structure suitable for injection molding in which the molding material 81 is a light metal. The light metal in the present invention refers to a metal having a specific gravity of 4 or less and includes not only a pure metal but also an alloy containing additional elements. Practically, in particular, a magnesium alloy or an aluminum alloy is effectively used as the molding material 81. Here, when the molding material 81 is an aluminum alloy, parts in contact with the molten material 83 are basically covered with a cermet based material to prevent erosion.

The injection molding machine of the present invention mainly includes an injection unit 1 configured to melt the molding material 81 and inject a predetermined amount of the molten material 83 into a cavity of a mold, a clamping unit (not shown) configured to open and close and clamp a mold, and a control unit (not shown) configured to control operations of the injection unit 1 and the clamping unit.

First Embodiment

Figure 3:
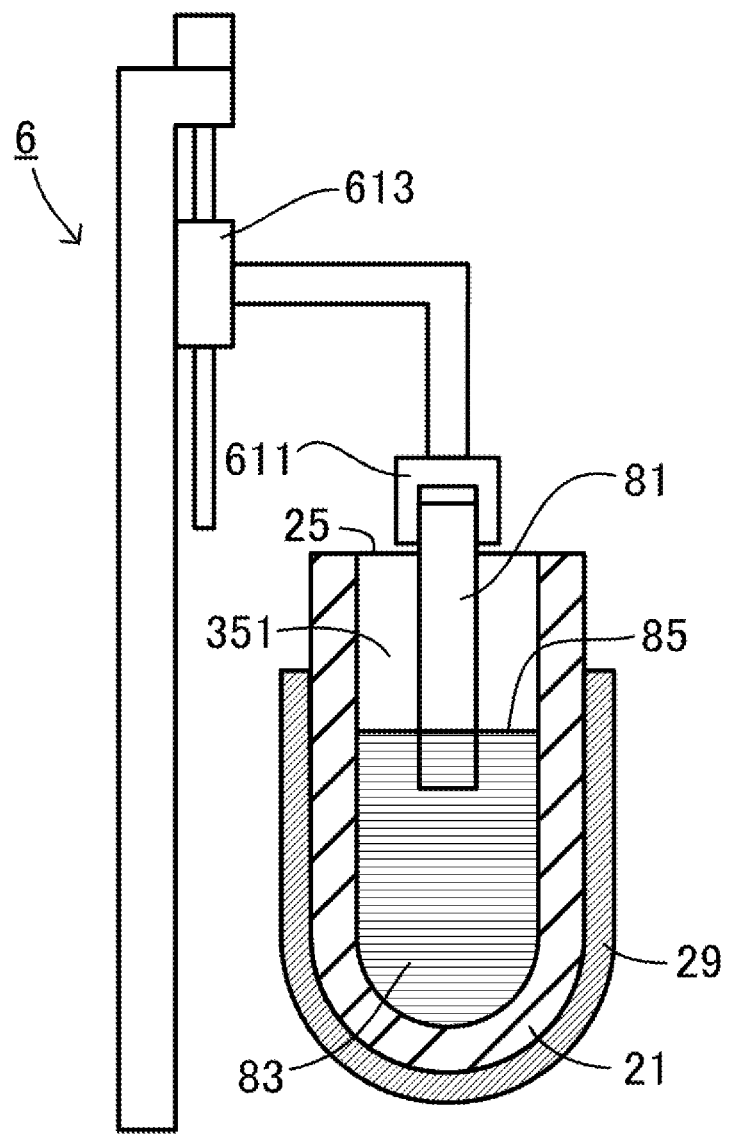
FIG. 3 is a cross-sectional view taken along arrows B-B in FIG. 1 and is a schematic diagram of a material supply device 6.
Figure 4:
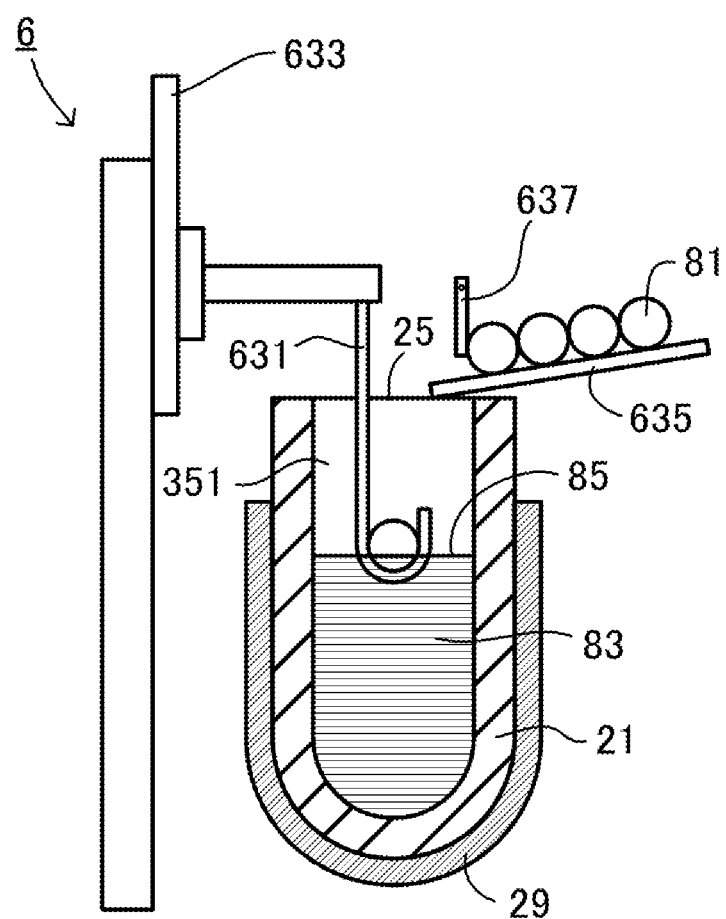
FIG. 4 is a cross-sectional view taken along arrows B-B in FIG. 1 and is a schematic diagram showing another example of the material supply device 6.
Figure 7:
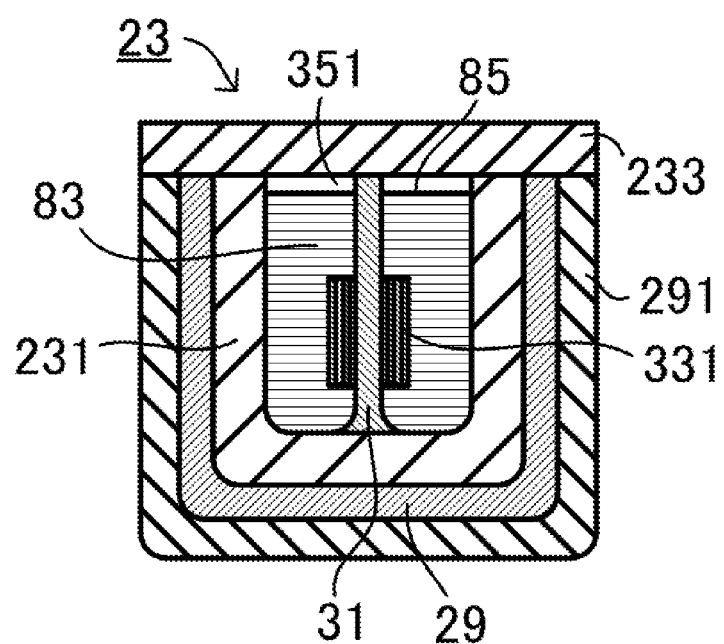
FIG. 7 is a cross-sectional view taken along arrows D-D in FIG. 6.
Figure 8:
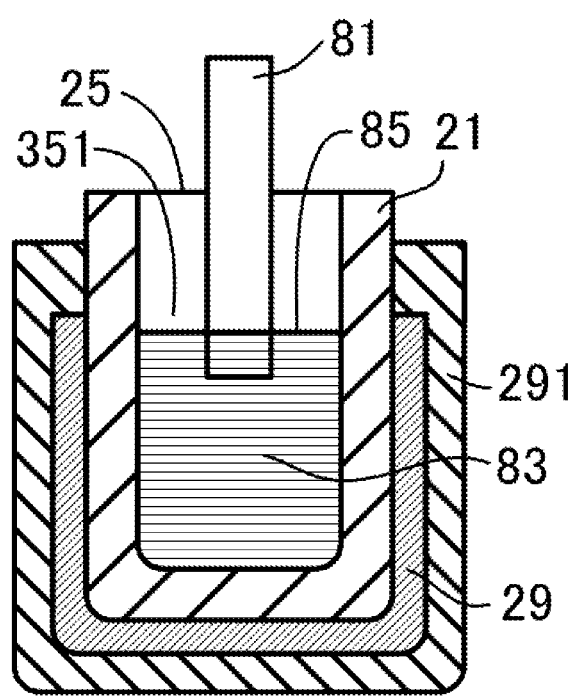
FIG. 8 is a cross-sectional view taken along arrows E-E in FIG. 6.

As shown in FIG. 1, a melting device 2 includes a vertical cylinder 21 that is provided on a rear end side of the melting device 2 and a horizontal cylinder 23 that communicates with the vertical cylinder 21 and is provided on a front end side of the melting device 2. As shown in FIG. 1 to FIG. 4, the vertical cylinder 21 has an U-shaped cross section and extends in a vertical direction, and the horizontal cylinder 23 has a circular cross section and extends in a horizontal direction. A plurality of heaters 29 are respectively provided to come in close contact on the vertical cylinder 21 and the horizontal cylinder 23. Here, in this specification, the U-shaped cross section means a shape which includes a pair of side plates and a bottom plate, and in which the side plates and the bottom plate are connected in a curved manner. For example, the U-shaped cross section may be a shape having a substantially semicircular bottom plate as shown in FIG. 3 and FIG. 4. The U-shaped cross section may be a shape which side plates and a bottom plate are connected at rounded corners as shown in FIG. 7 and FIG. 8, which indicate a second embodiment. The heater 29 that is integrated without being divided on a side plate and a bottom plate is easily provided to be in close contact with a cylinder with a U-shaped cross section. In addition, the front end of the horizontal cylinder 23 is closed by an end plug 27. If the end plug 27 is removable, maintenance of the melting device 2 is performed easily.

In the vertical cylinder 21, the molding material 81 supplied from a material supply port 25 is heated and melted by the heaters 29, and the molten material 83 is generated and is sent to the horizontal cylinder 23. The molten material 83 sent to the horizontal cylinder 23 is sent forward while it receives sufficient heat from the heaters 29, and is sent to an injection device 4 through a communication path 51 of a connecting member 5.

Figure 5:
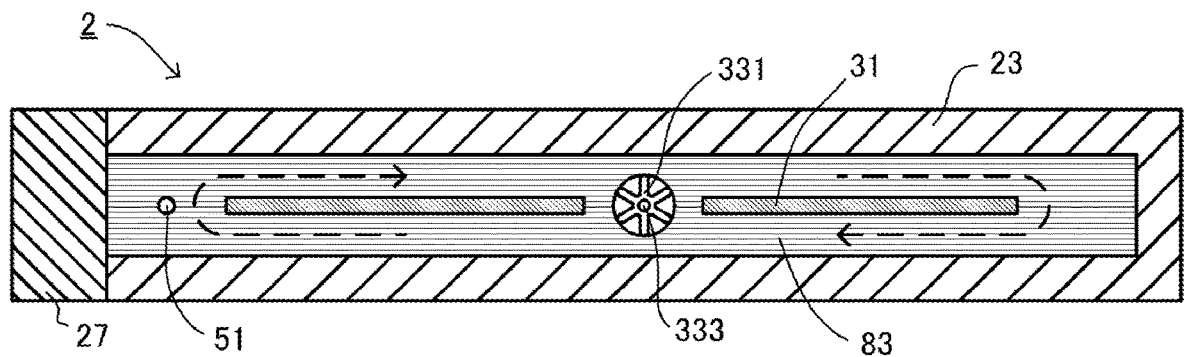
FIG. 5 is a cross-sectional view taken along arrows C-C in FIG. 1.

In the melting device 2, a partition plate 31 and a stirrer 33 are provided. The partition plate 31 partitions the inside excluding at least both ends of the melting device 2 and extends from the side of the material supply port 25 to the side of the communication path 51, that is, from the rear end side to the front end side. The stirrer 33 is configured to stir the molten material 83. The stirrer 33 is, for example, a gear pump in which an impeller 331 in the melting device 2 is rotated by a motor 335 through a shaft 333. The shape of the impeller 331 is appropriately selected according to the shape of the melting device 2 and the type of the molding material 81, for example, a gear shape or a paddle shape. In such a configuration, as indicated by dotted arrows in FIG. 5, a flow of the molten material 83 that circulates around the partition plate 31 is generated and it is possible to prevent the molten material 83 from stagnating. As a result, the temperature of the molten material 83 in the melting device 2 is uniformized, and it is possible to prevent sedimentation and segregation. By only stirring, it is difficult to prevent stagnation in portions other than the vicinity of the stirrer. In particular, when the melting device 2 includes the horizontal cylinder 23 that extends in the horizontal direction as in the present example, it is difficult to prevent stagnation in the whole of the horizontal cylinder 23. In the melting device 2 including the horizontal cylinder 23, it is particularly effective to flow the molten material 83 so that it circulates around the partition plate 31. Here, the stirrer 33 may be provided at any position on the melting device 2, but is preferably provided to be spaced a certain distance from the material supply port 25 in order to prevent the unmelted molding material 81 from coming in contact with the impeller 331. In addition, the partition plate 31 may be one plate or may be divided into a plurality of plates. In the present embodiment, two partition plates 31 are provided to sandwich the impeller 331.

Preferably, a torque meter 337 configured to detect a rotational speed and a rotation torque of the motor 335 is provided. When the rotational speed and the rotation torque are measured, it is possible to calculate a viscosity of the molten material 83. Further, it is possible to determine a molten state of the molten material 83 from the type and the viscosity of the molding material 81.

In order to prevent oxidation and nitriding of the molten material 83, it is preferable to fill with an inert gas with a predetermined concentration on a melting surface 85 of the molten material 83. In particular, when the molding material 81 is a magnesium alloy, this constitution is highly preferable because the magnesium alloy is likely to react with oxygen in the air and burn. In the present embodiment, when an inert gas is supplied from an inert gas supply device 35 into the vertical cylinder 21, an inert gas layer 351 including an inert gas with a predetermined concentration is formed on the melting surface 85. The inert gas may be a gas that does not substantially react with the molten material 83, and argon gas is suitable because it has a higher specific gravity than air, is readily available, and is harmless to the human body and the environment. In addition, an atmosphere meter 37 is preferably provided, and is configured to measure an atmosphere component of the inert gas layer 351. The inert gas supply device 35 controls an amount of an inert gas supplied so that the inert gas in the inert gas layer 351 has a predetermined concentration according to measurement results of the atmosphere meter 37. The atmosphere meter 37 may be a meter configured to directly measure a concentration of an inert gas or a meter configured to measure an oxygen concentration or a nitrogen concentration. Accordingly, it is possible to supply an inert gas without excess or deficiency.

A material supply device 6 supplies the molding material 81 from the material supply port 25. Here, when the molding material 81 is a light metal, a billet or an ingot can be used as the molding material 81. In this specification, a mass that is produced by refining and pouring the metal into a mold to solidify is called an ingot. A mass smaller than an ingot that is obtained by additionally casting an ingot and mainly molded in a cylindrical shape or a prismatic shape is called a billet.

For example, as shown in FIG. 3, the material supply device 6 is a device that includes an arm 611 holding the molding material 81 and a lifting device 613 configured to raise and lower the arm 611. The arm 611 holds the molding material 81 one by one. The lifting device 613 controls a height position and a lowering speed of the arm 611 and switches to stall and stop of lowering of the arm 611. The molding material 81 held by the arm 611 is gradually lowered from the material supply port 25, and is gradually melted from a portion immersed in the molten material 83.

Alternatively, for example, as shown in FIG. 4, the material supply device 6 is a device that includes a hook 631 supporting the molding material 81 and a lifting device 633 configured to raise and lower the hook 631. The hook 631 is fixed at a position at which the molding material 81 is partially immersed in the molten material 83 when the material is supplied. After supply of next molding material 81 is completed, the hook 631 is raised by the lifting device 633, and one molding material 81 stored by a stocker 635 is sent to the hook 631 by a shutter 637.

In addition to the specific examples described above, various forms of the material supply device 6 can be used, and a configuration in which the molding material 81 is partially melted and supplied in units of small amounts is preferable in order to prevent a rapid decrease in temperature of the molten material 83 in the vicinity of the material supply port 25. In devices of the related art, for example, the smallest amount of an ingot of ADC12, which is a kind of aluminum alloy, for distribution was generally about 5 kg, and when this was put into a melting device at one time, the temperature rapidly decreased. Therefore, it was necessary to perform re-casting the ingot into billets with a smaller mass. When the molding material 81 is supplied in units of small amounts, since it is possible to maintain a high temperature even if the ingot is directly used as the molding material 81, it is possible to further reduce costs for the molding material 81.

In addition, a liquid level indicator 39 configured to measure a height of the melting surface 85 in the melting device 2 is provided. As the liquid level indicator 39, various types of indicators such as a float type and a laser type can be used. The material supply device 6 supplies the molding material 81 such that the height of the melting surface 85 is within a predetermined range. Accordingly, it is possible to supply the molding material 81 without excess or deficiency.

As described above, it is preferable that the molding material 81 be supplied in units of small amounts in order to prevent a sudden decrease in temperature. As a method of controlling an amount of the molding material 81 supplied, for example, the following method is exemplified. For example, the material supply device 6 may supply the molding material 81 at a suitable supply speed. In addition, the material supply device 6 may switch start and stop of supply of the molding material 81 at a suitable period. In addition, the material supply device 6 may set an amount of the molding material 81 that is immersed in the molten material 83 to a suitable volume. Values of the suitable supply speed, the suitable period, and the suitable volume can be appropriately obtained according to the shape and the type of the molding material 81, the temperature of the heaters 29, the size of the internal capacity of the injection unit 1, and the like. For example, the suitable volume is an amount not exceeding 1 vol % of the total value of the internal capacity of the injection unit 1, that is, the internal capacity of the melting device 2, the communication path 51, and the injection device 4. The methods described above may be used in combination.

The injection device 4 operates a plunger drive unit 41 and retracts a plunger 43, and meters the molten material 83 sent from the melting device 2 to the injection device 4 through the communication path 51 of the connecting member 5. The injection device 4 remains in a predetermined temperature range in which a state in which the molten material 83 is melted by a plurality of heaters 47 can be maintained. After the injection device 4 metered the molten material 83, the communication path 51 is closed. Then, the injection device 4 operates the plunger drive unit 41, and advances the plunger 43 to a predetermined position on the injection device 4. When the plunger 43 advances to the predetermined position, a predetermined amount of the molten material 83 in the injection device 4 is injected into a cavity of a mold (not shown) from an injection nozzle 45.

The connecting member 5 connects the melting device 2 and the injection device 4. The melting device 2 and the injection device 4 communicate in the communication path 51 in the connecting member 5. The connecting member 5 remains in a predetermined temperature range in which a state in which the molten material 83 is melted by a heater 53 can be maintained.

A backflow prevention device 7 includes, for example, a valve seat 71 formed on an inner hole surface of the melting device 2, a rod-shaped backflow prevention valve rod 73 that comes in contact with or separates from the valve seat 71, and a fluid cylinder 75 such as a hydraulic cylinder which is fixed to a side surface of the melting device 2 and drives the backflow prevention valve rod 73 forward and backward. The communication path 51 is opened by the backflow prevention device 7 when a measuring operation starts and is closed immediately before an injection operation is performed. Here, the backflow prevention device 7 may be provided in the injection device 4 or the connecting member 5, and valves known in the related art such as a check valve or a rotary valve may be used.

Second Embodiment

Here, an injection molding machine according to a second embodiment of the present invention will be described. Here, members that are substantially the same as those of the first embodiment are denoted with the same reference numerals, and details thereof will not be described.

Figure 6:
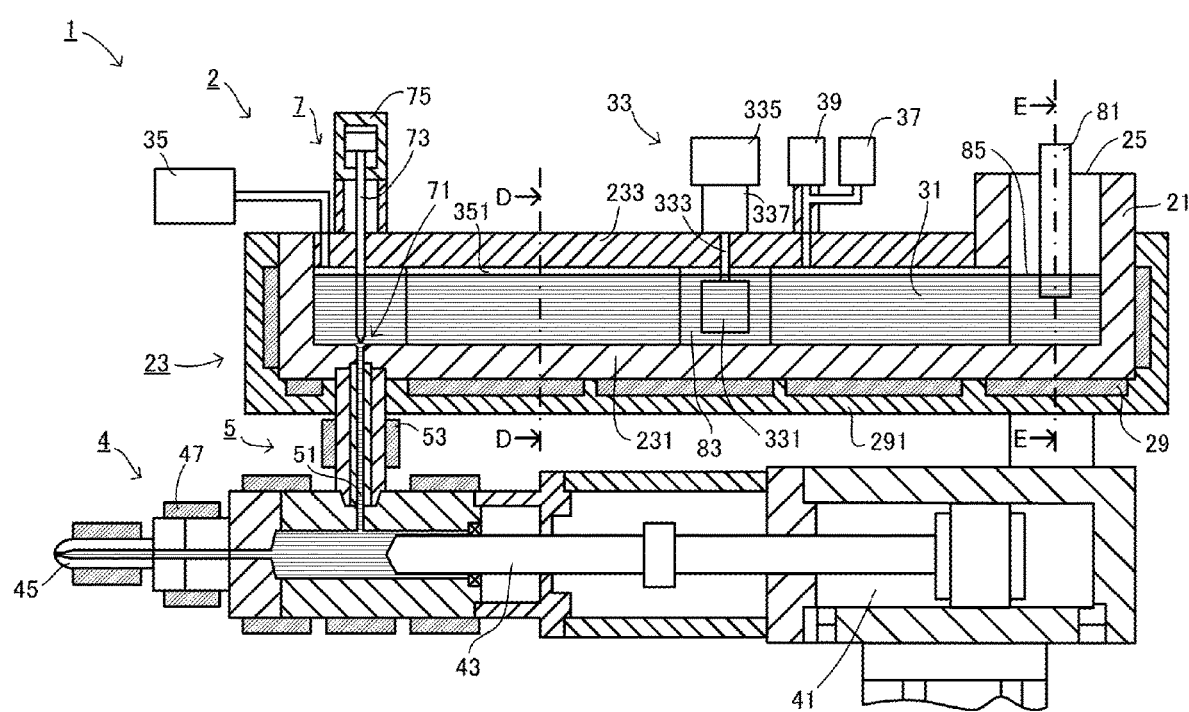
FIG. 6 is a configuration diagram of an injection unit 1 according to a second embodiment of the present invention.

As shown in FIG. 6, the melting device 2 includes the vertical cylinder 21 that is provided on a rear end side of the melting device 2 and the horizontal cylinder 23 that is provided on a front end side. The horizontal cylinder 23 includes a gutter 231 in which the molten material 83 is stored and a lid 233 provided on the top of the horizontal cylinder 23. As shown in FIG. 6 to FIG. 8, the vertical cylinder 21 has a U-shaped cross section and extends in a vertical direction, and the gutter 231 of the horizontal cylinder 23 has a U-shaped cross section that extends in a horizontal direction. The plurality of heaters 29 are respectively provided to be in close contact on the vertical cylinder 21 and the gutter 231 along the U-shape. An insulation portion 291 made of an insulation material is provided around the heater 29, and heat from the heater 29 does not escape to the outside, and thus thermal efficiency is improved. The lid 233 is made of an insulation material. The lid 233 may be opened or removed. When the lid 233 is open or removed, maintenance of the melting device 2 is performed easily.

It is preferable that the lid 233 not come in direct contact with the molten material 83, and a space with a predetermined thickness is provided between the lid 233 and the molten material 83. In the present embodiment, the space is the inert gas layer 351. When an inert gas is supplied into the horizontal cylinder 23 from the inert gas supply device 35, the inert gas layer 351 including an inert gas with a predetermined concentration is formed on the melting surface 85. In addition, when supply of the molding material 81 is controlled such that the height of the melting surface 85 measured by the liquid level indicator 39 does not exceed a predetermined value, the lid 233 and the molten material 83 are prevented from coming in contact with each other.

The invention described above is not limited to the above embodiments, and various modifications can be made based on the spirit and scope of the invention and they are not excluded from the scope of the invention. Particularly, specific devices having basic functions according to the spirit of the present invention are included in the present invention.

What is claimed is:

1. An injection molding machine comprising:
   a melting device in which a molding material melts to generate a molten material;
   an injection device from which the molten material supplied from the melting device is injected; and
   a connecting member including a communication path communicating with the melting device and the injection device,
   wherein the melting device includes a material supply port to which the molding material is supplied, a horizontal cylinder that sends the molten material to the communication path and extends in a horizontal direction, a partition plate that partitions an inside of the horizontal cylinder excluding at least both ends of the horizontal cylinder and extends from a side of the material supply port to a side of the communication path in the horizontal direction, and a stirrer configured to stir the molten material in a manner of circulating around the partition plate,
   wherein the stirrer includes an impeller that is provided in the horizontal cylinder and rotates.

2. The injection molding machine according to claim 1, wherein the molding material is a light metal.

3. The injection molding machine according to claim 2, wherein the molding material is a magnesium alloy or an aluminum alloy.

4. The injection molding machine according to claim 1, further comprising
   a torque meter configured to detect a rotational speed and a rotation torque of the stirrer.

5. The injection molding machine according to claim 1, wherein the horizontal cylinder includes a gutter in which the molten material is stored, and a lid that is openably or removably provided on a top of the horizontal cylinder.

6. The injection molding machine according to claim 5, wherein the gutter has an U-shaped vertical cross section.

7. The injection molding machine according to claim 5, comprising
   a heater provided in the gutter, and
   an insulation portion made of an insulation material around the heater.

8. The injection molding machine according to claim 1, wherein the stirrer includes a motor configured to drive the impeller, and
   wherein the injection molding machine further includes a torque meter configured to detect a rotational speed and a rotation torque of the motor.

9. The injection molding machine according to claim 1, wherein the melting device includes a vertical cylinder that has the material supply port, communicates with the horizontal cylinder, and extends in a vertical direction, and
   a heater provided in the vertical cylinder.

10. The injection molding machine according to claim 9, wherein the vertical cylinder has an U-shape vertical cross section.

11. The injection molding machine according to claim 9, wherein the molding material is a billet or an ingot, and
    wherein the injection molding machine further includes a material supply device configured to supply the molding material in a manner of being partially immersed in the molten material in the vertical cylinder.

12. The injection molding machine according to claim 1, further comprising
    an inert gas supply device configured to supply an inert gas with a predetermined concentration into the melting device and form an inert gas layer on a melting surface of the molten material.

13. The injection molding machine according to claim 12, further comprising
    an atmosphere meter configured to measure at least one of an inert gas concentration, an oxygen concentration and a nitrogen concentration of the inert gas layer,
    wherein the inert gas supply device controls an amount of the inert gas supplied according to a measurement value of the atmosphere meter.

14. The injection molding machine according to claim 1, wherein the molding material is a billet or an ingot, and
    wherein the injection molding machine further includes a material supply device configured to supply the molding material in a manner of being partially immersed in the molten material.

15. The injection molding machine according to claim 14, wherein the material supply device includes an arm holding the molding material, and a lifting device configured to raise and lower the arm.

16. The injection molding machine according to claim 14, wherein the material supply device includes a hook supporting the molding material, and a lifting device configured to raise and lower the hook.

17. The injection molding machine according to claim 14, further comprising
    a liquid level indicator configured to measure a height of a melting surface of the molten material in the melting device,
    wherein the material supply device supplies the molding material in a manner of the height of the melting surface being within a predetermined range.

18. The injection molding machine according to claim 14, wherein the material supply device supplies the molding material in a manner of an amount of the molding material immersed in the molten material not exceeding 1 vol % of a total value of an internal capacity of the melting device, the communication path and the injection device.

* * * * *